United States Patent
Takenaka et al.

[11] Patent Number: 6,131,902
[45] Date of Patent: *Oct. 17, 2000

[54] SHEET FEEDING PATHS FOR APPARATUS WITH FEED PATHS SELECTABLE TO CORRESPOND TO DESIRED FUNCTION OF APPARATUS

[75] Inventors: Eiji Takenaka, Atsugi; Masahiro Yonekawa, Tokyo, both of Japan

[73] Assignee: Ricoh Company, Ltd., Tokyo, Japan

[*] Notice: This patent is subject to a terminal disclaimer.

[21] Appl. No.: 09/197,207

[22] Filed: Nov. 20, 1998

[51] Int. Cl.[7] .................... B65H 39/10; G03G 15/00
[52] U.S. Cl. .................. 271/303; 271/279; 399/361; 399/363
[58] Field of Search .................... 271/303, 298, 271/279; 399/361, 363, 397, 405, 365

[56] References Cited

U.S. PATENT DOCUMENTS

| | | |
|---|---|---|
| 3,860,339 | 1/1975 | Bendall . |
| 3,865,482 | 2/1975 | Bendall et al. . |
| 4,750,016 | 6/1988 | Kusumoto et al. . |
| 5,095,370 | 3/1992 | Takada et al. . |
| 5,201,517 | 4/1993 | Stemmle ............ 271/291 |
| 5,201,518 | 4/1993 | Isoda ................ 271/305 |
| 5,202,736 | 4/1993 | Komurasaki ....... 355/308 |
| 5,234,213 | 8/1993 | Chen ................. 271/303 |
| 5,237,381 | 8/1993 | Hamada ............ 355/321 |
| 5,331,386 | 7/1994 | Mizubata et al. . |
| 5,438,435 | 8/1995 | Lawniczak ........ 358/496 |
| 5,567,068 | 10/1996 | Egashira et al. .. 400/625 |
| 5,862,435 | 1/1999 | Suzumi et al. .... 399/68 |
| 5,884,117 | 3/1999 | Tanoue et al. .... 399/1 |
| 5,915,157 | 6/1999 | Takenaka et al. . 399/361 |
| 5,996,995 | 12/1999 | Kim et al. ......... 271/303 |
| 6,011,940 | 1/2000 | Van Lydegraf .... 399/87 |

FOREIGN PATENT DOCUMENTS 56-32151  4/1981  Japan .

Primary Examiner—Donald P. Walsh
Assistant Examiner—Daniel K Schlak
Attorney, Agent, or Firm—Oblon, Spivak, McClelland, Maier & Neustadt, P.C.

[57] ABSTRACT

A sheet transport system for an image-forming apparatus including a scanner unit on an upper part of an image-forming unit. A paper ejecting path ejects an image formed paper sheet to an ejected paper stacker via the image-forming unit. The paper ejecting path includes a straight sheet feeding path and a turn-around sheet feeding path. A scanning sheet path conveys an original document through an original document platform to a scanned paper stacker via the scanner unit. A sheet path selector selects one of the paper ejecting path or scanning sheet path, the scanning sheet path and the paper ejecting path crossing each other. A manual paper ejecting path selector allows manually selecting one of the straight sheet feeding path and the turn-around sheet feeding path.

10 Claims, 12 Drawing Sheets

SHEET FEEDING PATHS FOR APPARATUS WITH FEED PATHS SELECTABLE TO CORRESPOND TO DESIRED FUNCTION OF APPARATUS

BACKGROUND OF THE INVENTION

1. Field of the Invention

This invention relates to a sheet transport system and apparatus for an image-forming apparatus, and particularly to a sheet transport system and apparatus for an image-forming apparatus including a scanner unit arranged on an upper part of an image-forming unit.

2. Description of the Background Art

An image-forming apparatus may include a straight feeding sheet path system and a turn-around feeding sheet path system.

The straight feeding sheet path system ejects a sheet with an image formed thereon substantially horizontally from an image-forming unit to an ejected sheet stacker from a sheet chute. The straight feeding sheet path system has an advantage that when thick or hard paper sheets, such as postcards, are used as printing papers, these printing papers are not bent and do not curve in the straight feeding sheet path system.

On the other hand, the turn-around feeding sheet path system ejects printing papers from an image-forming unit to an ejected sheet stacker in a different direction of the sheet chute than in the straight feeding sheet path system. An image-forming apparatus employing such a turn-around feeding sheet path system can be smaller in size in comparison with an image-forming apparatus employing the straight feeding sheet path system.

An image-forming apparatus with a turn-around feeding sheet path system may eject printing papers from an ejected sheet stacker into a sheet stacker which is in an inner area of an upper projection of an apparatus main body. Therefore, in the image-forming apparatus with a turn-around feeding sheet path system, the body size of the apparatus is not influenced by the size of the printing sheets. Furthermore, image-formed sheets (i.e. sheets which have images formed thereon) of the image-forming apparatus with the turn-around feeding sheet path system are automatically sorted on output from the ejected sheet stacker. Therefore, a user does not need to rearrange the image-formed paper sheets after they are output.

Also, an image-forming apparatus can utilize a combined system of the above two feeding sheet path systems. A combined system may have some of the advantages of both of the above two systems. One type of system attempts to select either the straight feeding sheet path system or the turn-around sheet path system by utilizing a path selector. For example, U.S. Pat. No. 4,750,016 discloses an image forming apparatus which utilizes a path selector which selects feeding sheet paths by adjusting an axis of the path selector by a movement of a pivotally supported tray.

Recently, processor units, for example personal computers, have been designed to have printer controls. Printers themselves utilized with these personal computers may not include a manual operation panel, because a clear appearance of the printer may be preferred from a design point of view. Furthermore, image-forming apparatuses of a multiple function type that include functions of a fax and copy machine in addition to a printer are now being widely used.

A system may attempt to add a printer to other functions, for example a fax machine, a copy machine, etc. For example, U.S. Pat. No. 5,095,370 discloses one type of a multiple function type image-forming apparatus. This multiple image-forming apparatus utilizes a turn-around feeding sheet path system, and arranges a scanner in a clearance space of a main body on the basis of a printer. Such an apparatus has realized miniaturization of a an overall size of the apparatus according to a position of the scanner. However, the apparatus disclosed in U.S. Pat. No. 5,095,370 suffers from a drawback in that it cannot establish a straight feeding sheet path in addition to the turn-around feeding sheet path.

The present inventors considered combining such a multiple function image-forming apparatus with the above two feeding sheet path systems. With such a combination, the multiple function image-forming apparatus arranged with the scanner unit on an upper part of the printer, which adopts the above two path systems, could minimize an area of an upper projection of the apparatus. However, the present inventors also identified that with such a combination the turn-around sheet feeding path and the scanning sheet path cross at an upper part of the ejected paper. This crossing of the sheet paths would cause a jam between an image formed sheet and a scanning sheet in the case of the multiple function image-forming apparatus with the scanner arranged on the upper part of the printer. Furthermore, the overall body size of the apparatus would become large if a distance from a bottom point of the ejected sheet stacker in the turn-around sheet path to the cross point is long in order to prevent an image formed sheet and a scanned sheet from jamming at the cross point. Still further, such a multiple function image-forming apparatus would need an input panel in which a user inputs phone numbers of an address in case of a fax, etc.

Therefore, when the multiple function image forming apparatus simply adds a scanner unit on the upper part of a printer unit, the input panel of the apparatus is visible from outside and the appearance is not clear in the case that the apparatus is used as a printer.

SUMMARY OF THE INVENTION

Accordingly, one object of the present invention is to provide a novel image-forming apparatus with enhanced sheet transport operations.

A further object of the present invention is to provide a novel image-forming apparatus which can incorporate both a straight feeding sheet path system and a turn-around feeding sheet path system.

A further object of the present invention is to provide a novel image-forming apparatus which can include operations of both scanning and printing and which can utilize plural sheet transport systems.

A further object of the present invention is to provide a novel image-forming apparatus which includes multiple functions and which has a design to optimize display portions of control panels. A further object of the present invention is to provide a novel image-forming apparatus which includes such multiple functions in the device in which the multiple paths cross each other.

These and other objects of the present invention are achieved by a novel image-forming apparatus which includes a scanner unit formed at an upper portion thereof Further, a paper ejecting path is provided to eject an image formed paper sheet to an ejected paper stacker. A scanning sheet path is provided to convey an original document through an original document platform to a scanned paper stacker via the scanner unit. A sheet path selector is further provided to select between the paper ejecting path and the scanning sheet path. Further, the scanning sheet path and the paper ejecting path have a point to cross each other.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein.

DESCRIPTION OF THE PREFERRED EMBODIMENTS

Figure 1:
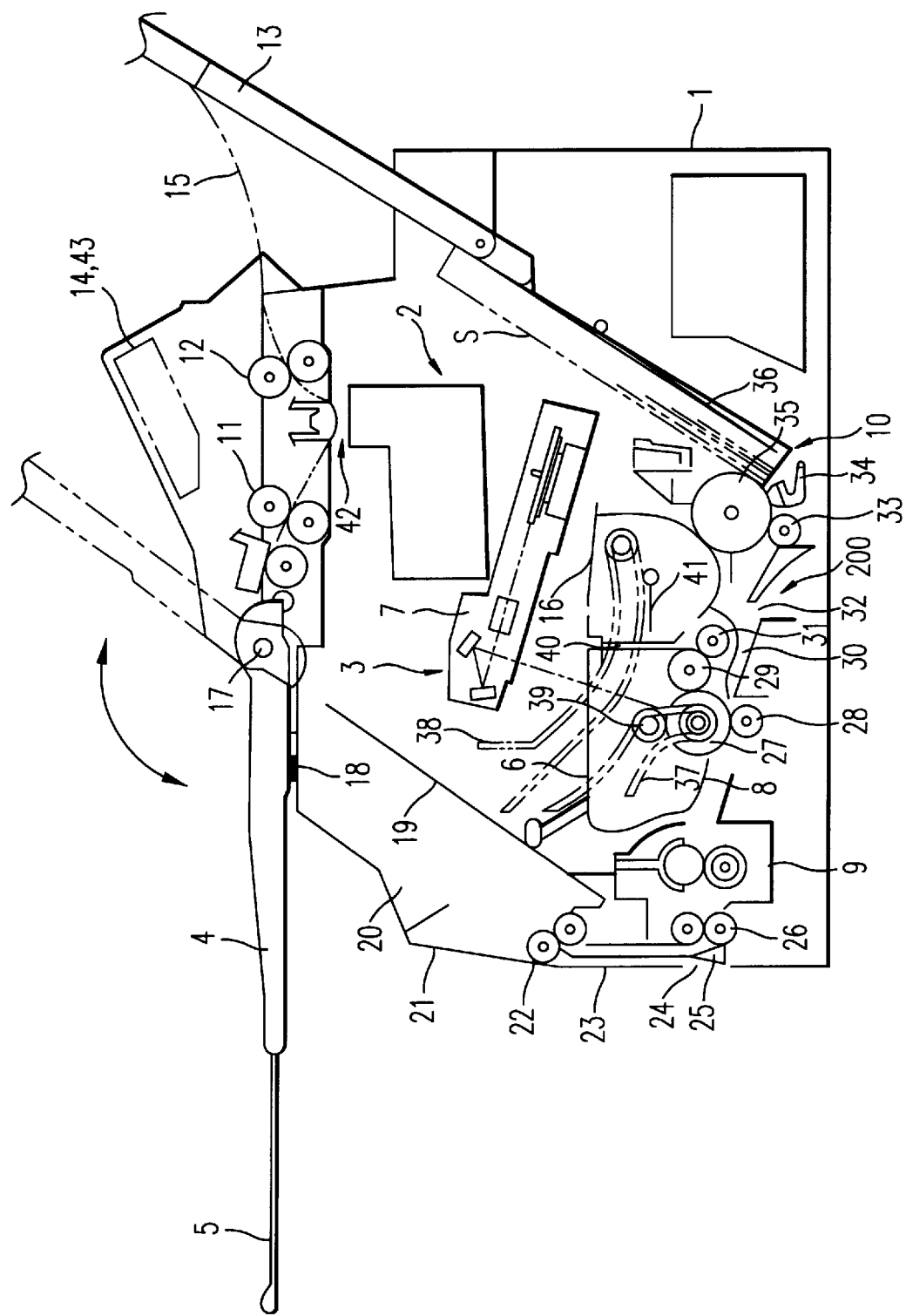
FIG. 1 is a cross-sectional view of a first embodiment of an image forming apparatus according to the present invention.

A description will now be given of preferred embodiments according to the present invention, in which like reference numerals designate identical or corresponding parts.

FIG. 1 is a cross-sectional view of a first embodiment of the present invention. As shown in FIG. 1, a scanner unit 2 is disposed at a top portion of an image-forming apparatus 1. A document tray 4 is set up in an upper part of the main body of the apparatus 1. In the scanner unit 2, a couple of pair of rollers 11, 12 transport a document to an upper part 13 of a paper supply stacker 10 via a scanner portion 42 along a scanning sheet path 15 (shown in dotted lines).

The scanner unit 2 feeds the document to the scanner portion 42, and the scanner portion 42 then scans the fed document. The scanned document is then ejected from the scanner portion 42 to the upper part 13 of paper supply tray 10 by the pair of rollers 11, 12. The scanning sheet path 15 is composed of the route from the document tray 4 to the upper part 13 of the paper supply tray 10 via the scanner portion 42.

An image-forming unit 3 is deposed in the image-forming apparatus 1. A feeding sheet path 30 is disposed under the image-forming unit 3 from a bottom of the paper supply tray 10. The feeding sheet path 30 is a straight feeding sheet path which leads to a turnaround feeding sheet path 23. A sheet path selector 25 is provided to select one these sheet feeding paths.

The document tray 4 can rotate on axis 17 between a document scanning position and an opened position. The document tray 4 is located in the document scanning position (shown with a solid line) in the scanning mode. The document tray 4 is located in the opened position (shown with a dotted line) in the printing mode. In the printing mode, the underside of the document tray 4 provides an extension to an ejected paper stacker 20.

Furthermore, a back-up tray 5 for scanning paper can be provided on a side of a free edge of the document tray 4. Stoppers (not shown) can be set up in the main body of the apparatus 1 which support the document tray 4 so that the document tray 4 is stable in either the document scanning position or the opened position. The image-forming unit 3 also includes a process cartridge 6, an optical system unit 7 and an image-fixing unit 9. The process cartridge 6 includes a photosensitive drum 27, an electrostatic charger 39, a developing unit 16 and a transfer charger 28.

The photosensitive drum 27 is driven to rotate and serves as an electrostatic carrier. The electrostatic charger 39, the developing roller 29 and the transfer charger 28 are arranged in this order in the rotating direction around the photosensitive drum 27. The electrostatic charger 39 electrostatically charges a surface of the photosensitive drum 27 to a uniform condition. The developing unit 16 supplies toner and develops an electrostatic latent image formed on the surface of the photosensitive drum 27 into a visible image with the toner on the basis of a laser beam irradiated from the optical system unit 7 as described later. The developing roller 29 includes a toner agitator 41 in a toner container, which is integrated to the cartridge 6. The developing roller 29 also includes a cleaning blade 40. The cleaning blade 40 contacts the developing roller 29 in the process cartridge 6 and cleans the developing roller 29. The transfer charger 28 transfers the visible image produced by the developing roller 29 to a paper sheet that is supplied from a paper supply stacker 10 with a pair of rollers 33, 35 through the feeding paper path 30. The image-fixing unit 9 fixes the visible toner image with a pair of rollers.

The optical system unit 7 is arranged in an upper part of the process cartridge 6. The optical system unit 7 includes a rotatable polygon mirror having multiple reflecting surfaces and an optical lens system which guides laser beams in predetermined directions to the photoconductive drum 27 to form an image thereon. The optical system unit 7 irradiates photoconductive drum 27 with these laser beams corresponding to image data transmitted from an image processing controller (not shown).

Still referring to FIG. 1, the paper supply tray 10 is arranged opposite the image-fixing unit 9. The paper supply tray 10 supports papers sheets supplied to the image-forming unit 3. An upper part 13 of the paper supply tray 10 also supports documents scanned with the scanner portion 42.

A paper supply roller 35 is arranged at a bottom end of the paper supply tray 10. Further, a pressure board 36 is arranged under the paper supply tray 10 and contacts the bottom of the paper supply roller 35 when no paper sheets are placed on the paper supply tray 10. The paper supply roller 35 also contacts a separation pad 34. The separation pad 34 prevents the paper supply roller 35 from multiple feeding of paper sheets when paper sheets are conveyed to the printing unit 3 because the separation pad 34 elastically pushes the paper supply roller 35. A pressure roller 33 that rotates according to the rotation of the paper supply roller 35 is provided at a bottom end of the paper supply roller 35. The paper supply roller 35, the separation pad 34 and the pressure roller 33 are arranged on an entrance side of the paper feeding path 30. Furthermore, the paper feeding path 30 extends to the image fixing unit 9 which is arranged on the side of the lower reaches of the paper feeding path 30, via the photosensitive drum 27.

Also, image formed paper stacker 20 is arranged between the fixing unit 9 and the document tray 4 on an upper part of the fixing unit 9. The image formed paper stacker 20 has a paper receive tray 19 supporting the image formed paper sheets. The paper receive tray 19 is located in a position in line with the document tray 4 when the document tray 4 is rotated to the opened position (dotted line of document tray 4). Still furthermore, when the document tray 4 is in the opened position (dotted line), the document tray 4 is formed to be a part of the turn-around paper path 23 as a support tray of the paper receive tray 19.

The straight feeding paper path is formed on a bottom side of the apparatus 1. The straight feeding paper path feeds paper sheets through the fixing unit 9 from a paper chute 24 located on a horizontal extension of the fixing unit 9. The paper chute 24 is also located in the main body of the apparatus 1 at an opposite side the paper supply tray 10. A pair of eject paper rollers 26 are furthermore located between the fixing unit 9 and the paper chute 24. Also, the paper path selector 25 is located between the pair of eject paper rollers 26 and the paper chute 24. The paper selector 25 rotates around a support axis and changes the ejecting direction of paper sheets from between the turn-around feeding paper path and the straight feeding paper path.

Figure 2:
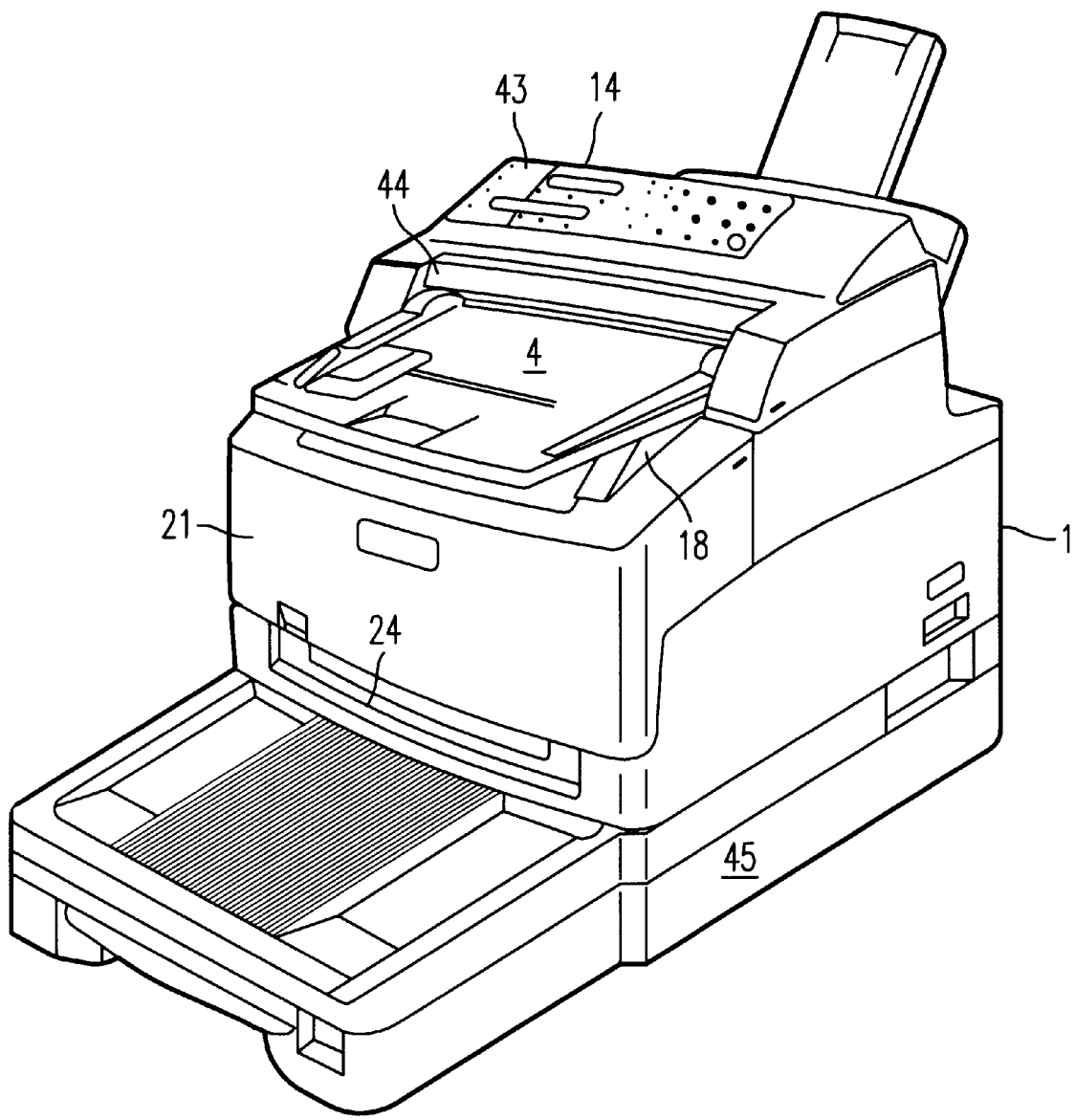
FIG. 2 is a perspective view of a scanning position in the present invention.

FIG. 2 is a perspective view of a main body of the image forming apparatus 1 according to a first embodiment of the present invention in the scanning mode.

The apparatus 1 includes an input panel 14 and a display panel 43 on a top of a main body. The display panel 43 displays printing conditions in the printing mode. In the scanning mode, a support device 18 supports the document tray 4. Also, support wall 44 is located on a top of the apparatus 1, which support wall 44 supports the opened document tray 4 in the printing mode.

Figure 3:
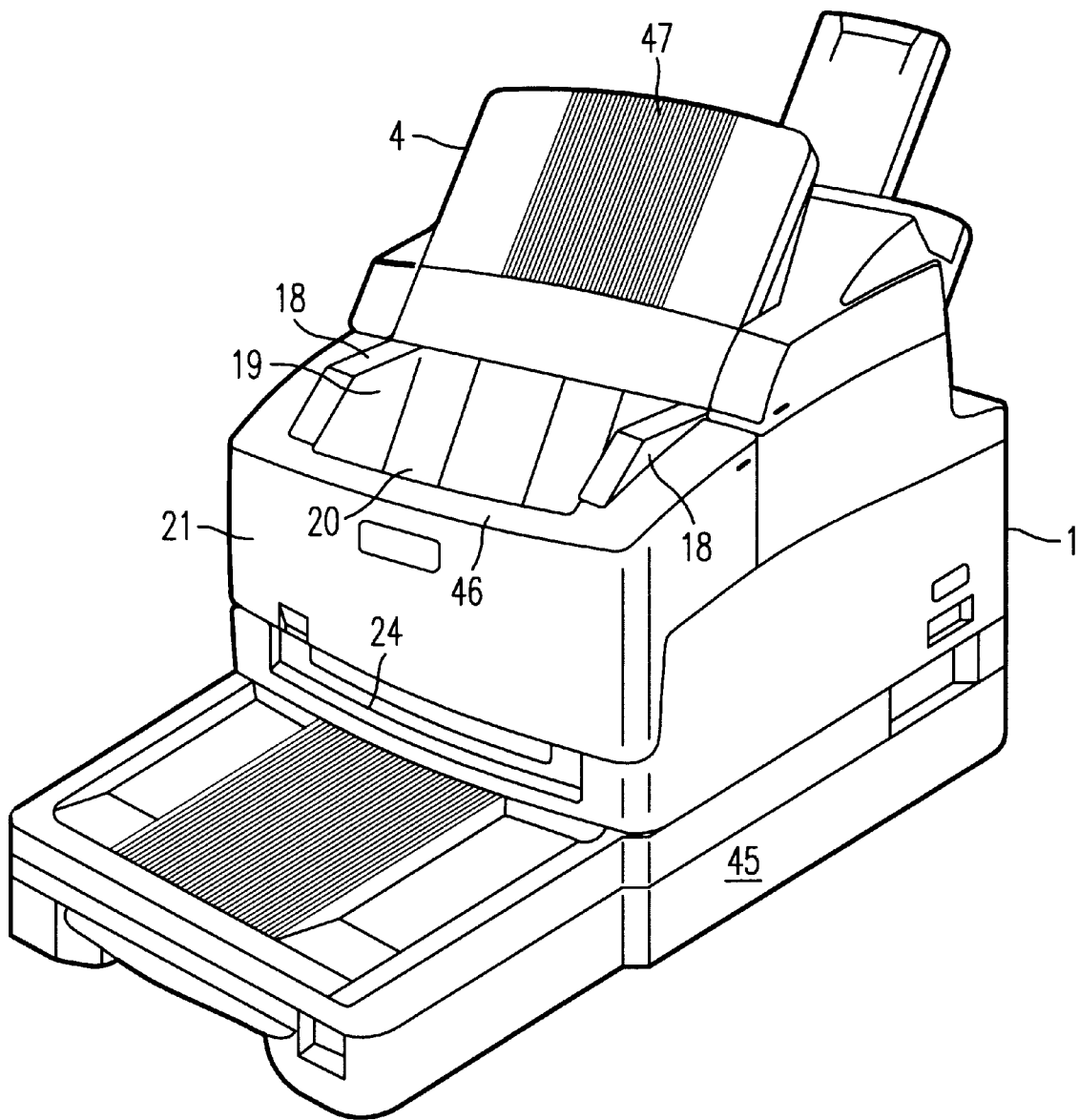
FIG. 3 is a perspective view of a printing position in the present invention.
Figure 4:
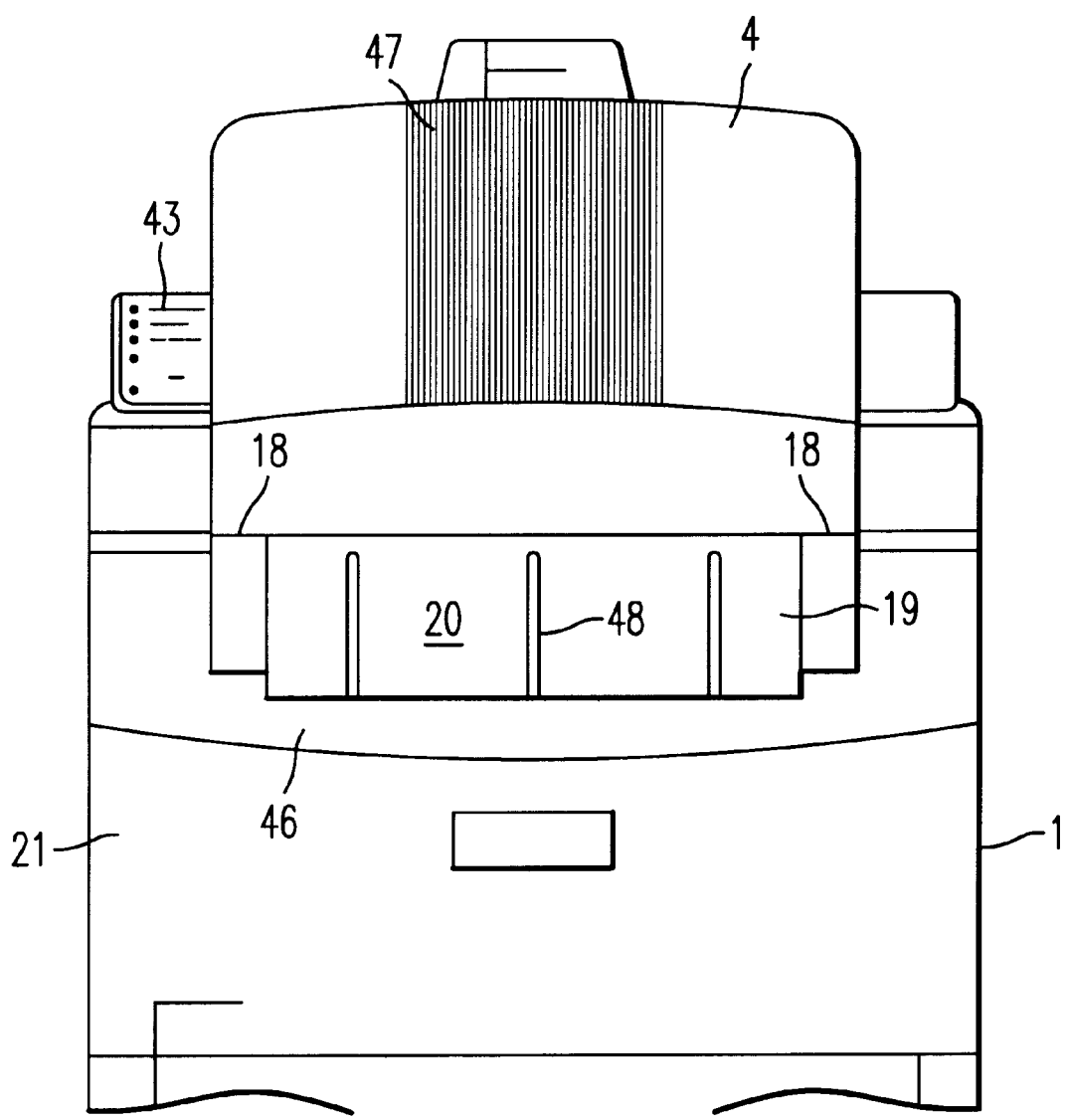
FIG. 4 is a front view of the first embodiment of the apparatus according to the present invention.

FIG. 3 is a perspective view of the main body of the image forming apparatus 1 according to the first embodiment of the present invention in the printing mode. FIG. 4 is a front view of the first embodiment of the present invention in the printing mode. In this printing mode, the input panel 14 is covered up because the document tray 4 is opened. Furthermore, on opening of the upper part in the eject paper stacker 20 is widely opened because a front edge 46 of the support wall 21 is located horizontally lower than the support device 18 in the printing mode. The display panel 43, however, is visible in the printing mode as shown in FIG. 4.

In FIGS. 2, 3 and 4, an attached paper supply unit 45 can be set up under the main body of the apparatus 1. Paper sheets conveyed from the attached paper supply unit 45 are sent in the direction of an arrow 200 in FIG. 1 and an image can then be formed on the paper sheets fed from the attached supply unit 45.

Furthermore, an underside of the document tray 4 can include ribs 47 on its surface to reduce friction power by static electricity between paper sheets and the supporting ejecting paper stacker. The paper receive tray 19 can also include ribs 48 for the same reason.

Figure 5:
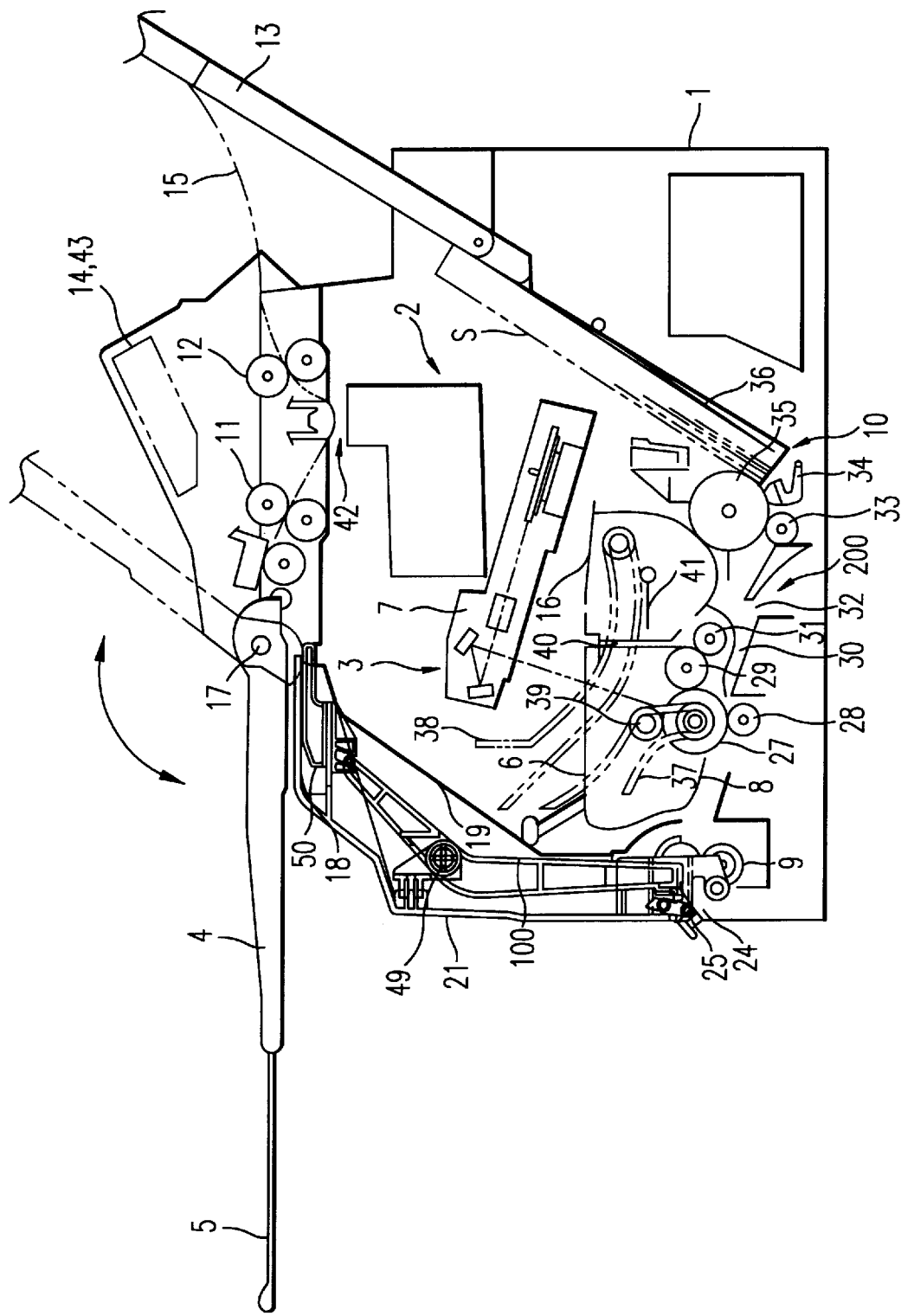
FIG. 5 is a cross-sectional view of a second embodiment of an image forming apparatus according to the present invention.

FIG. 5 is a cross-sectional view of a second embodiment according to the present invention. An explanation is omitted for the same units as in the embodiment of FIG. 1.

The embodiment of FIG. 5 includes an interlock arm 100 formed between the document tray 4 and the paper path selector 25. The interlock arm 100 is located on a side in the eject paper stacker 20 and is rotatably held at an axis 49. The interlock arm 100 interlinks the rotational movement of the document tray 4 and the selection of the paper path selector 25.

Figure 6:
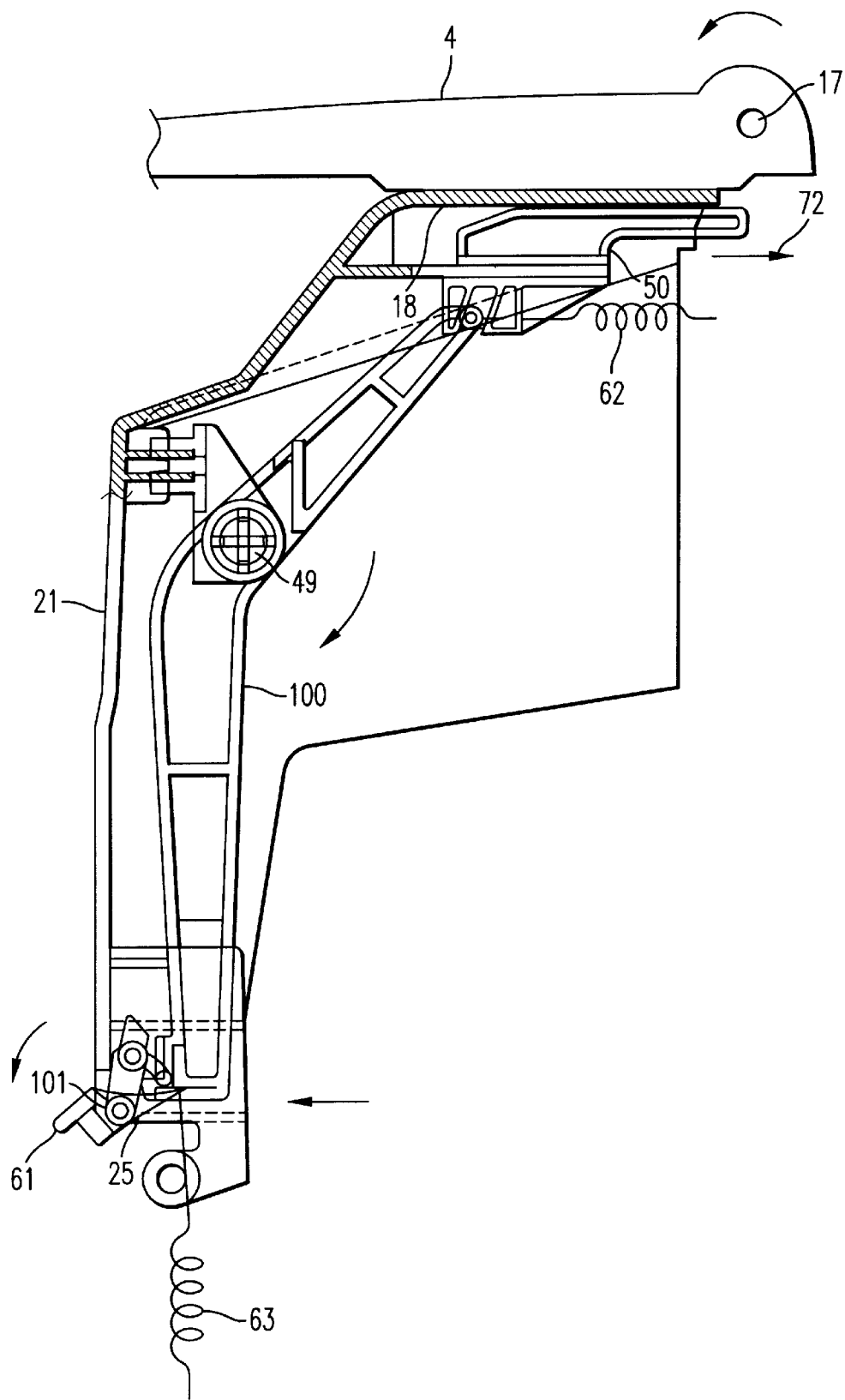
FIG. 6 is a cross-sectional view of an interlock system located in a position of a selection of a straight feeding path of the second embodiment of an image forming apparatus according to the present invention.

FIG. 6 is a cross-sectional view of the interlock arm 100 and the paper path selector 25 and a slide lever 50 interlinked with the interlock arm 100 in the scanning mode. In the scanning mode, the document tray 4 is rotated around the axis 17 to the position shown in solid lines in FIG. 5. When the document tray 4 is in this position, the slide lever 50 is pulled in the direction of the arrow 72 (to the right in FIG. 6) by the power of a spring 62. When the slide lever 50 is pulled in the above direction, the interlock arm 100 rotates clockwise and pushes the arm of the paper path selector 25. When the arm of the paper path selector 25 is thus pushed, the paper path selector 25 rotates clockwise about the axis 101. In this case, the paper path selector 25 is positioned to select the straight feeding sheet path. Therefore, in this mode any feeding paper sheet that passes through the image-fixing unit 9 is ejected in the straight feeding path from the paper chute 24 by contacting an under part of a protrusion portion of the paper path selector 25.

Figure 7:
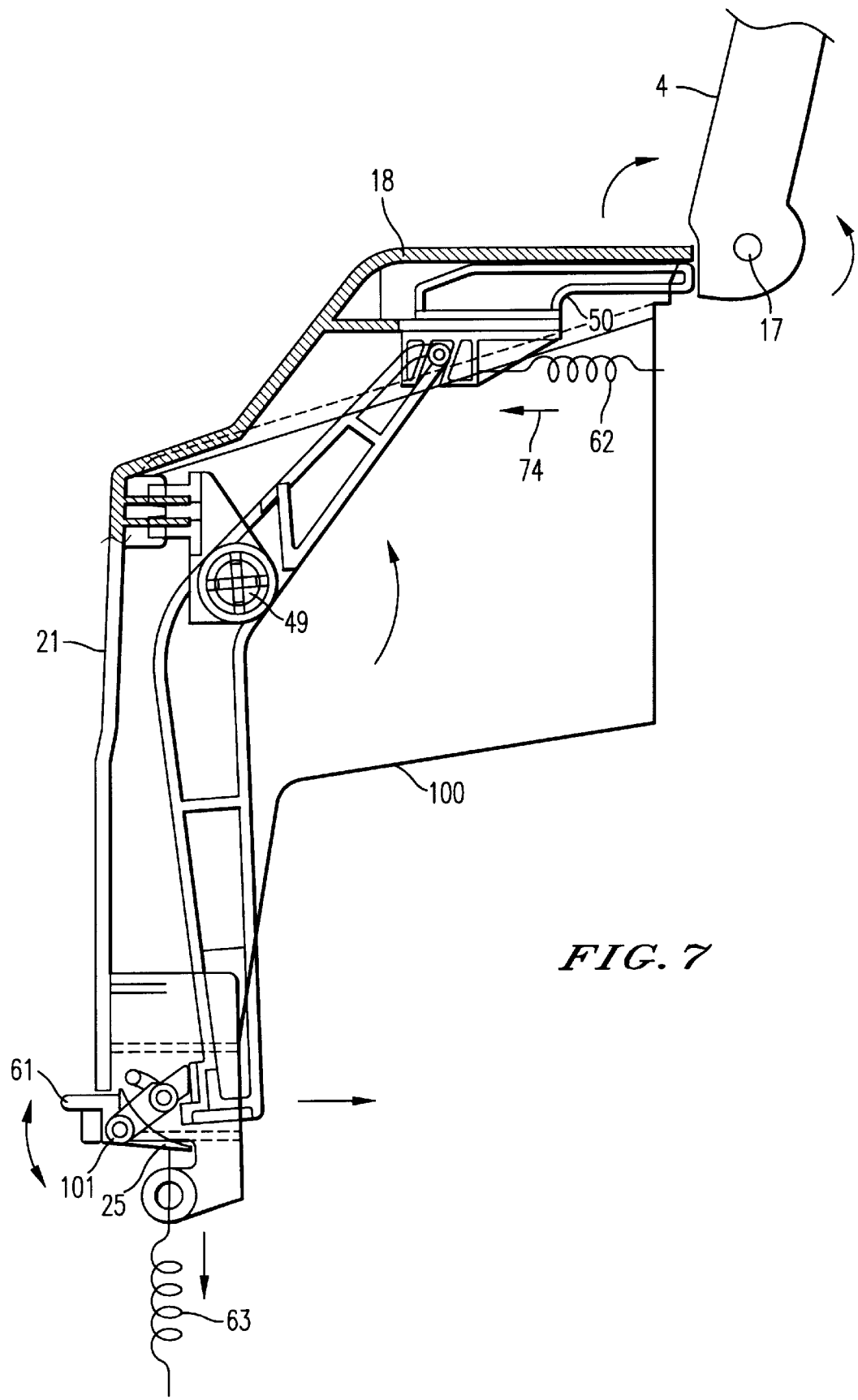
FIG. 7 is a cross-sectional view of an interlock system located in a position of a selection of a turn-around feeding path of the second embodiment of an image forming apparatus according to the present invention.

FIG. 7 is a cross-sectional view of the interlock arm 100 and the paper path selector 25 and the slide lever 50 interlinked with the interlock arm 100 in the printing mode. In the printing mode, the document tray 4 is rotated around axis 17 to the opened position (shown in dashed lines in FIG. 5). When the document tray 4 is the opened position, the slide lever 50 is pushed by the edge of the document tray 4 and slides in the direction of an arrow 74 in FIG. 7. When the slide lever 50 slides, the interlock arm 100 is rotated counterclockwise by the slide lever 50 and the power pushing the arm of the paper path selector 25 is canceled. Therefore, the paper path selector 25 is pulled to a position to select the turn-around feeding sheet path by the power of a spring 63. A feeding paper sheet that then passes through the image-fixing unit 9 follows the turn-around feeding sheet path to be stacked in the ejecting paper stacker 20 by contacting an upper part of a protrusion portion of the paper path selector 25.

In the printing mode, in a case that the paper path selector 25 is not moved by the spring, the position of the paper path selector 25 can be selected between the turn-around sheet feeding path and the straight sheet feeding path with paper path selector lever 61.

Figure 8:
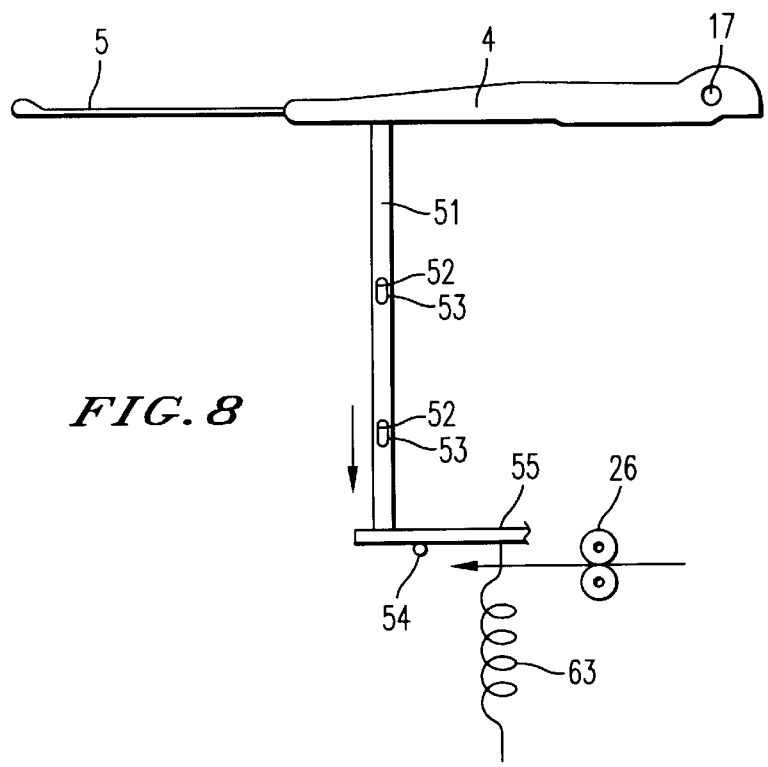
FIG. 8 is a cross-sectional view of an interlock system located in a position of a selection of a straight feeding path of a third embodiment of an image-forming apparatus according to the present invention.

FIG. 8 is a cross-sectional view of another interlock mechanism in a scanning mode according to a further embodiment of the present invention.

In the embodiment of FIG. 8, an interlock arm 51 is pushed in a vertical upper direction by power of spring 63. The interlock arm 51 includes some slits 53 located in the vertical direction. The slits 53 limit vertical movement of the interlock arm 51 by corresponding pins 52 placed in the slits 53. The pins 52 are located in the main body of the apparatus 1. Further, a paper path selector 55 is also pulled by the power of the spring 63 clockwise about an axis 54. When the document tray 4 is located in the scanning position, the document tray 4 pushes the interlock arm 51 in a vertical lower direction. Furthermore, the interlock arm 51 pushes the paper path selector 55 counterclockwise about axis 54. Therefore, the paper path selector 55 is located at a position of selecting the straight feeding sheet path and fed paper sheets are thus output to the sheet chute 24.

Figure 9:
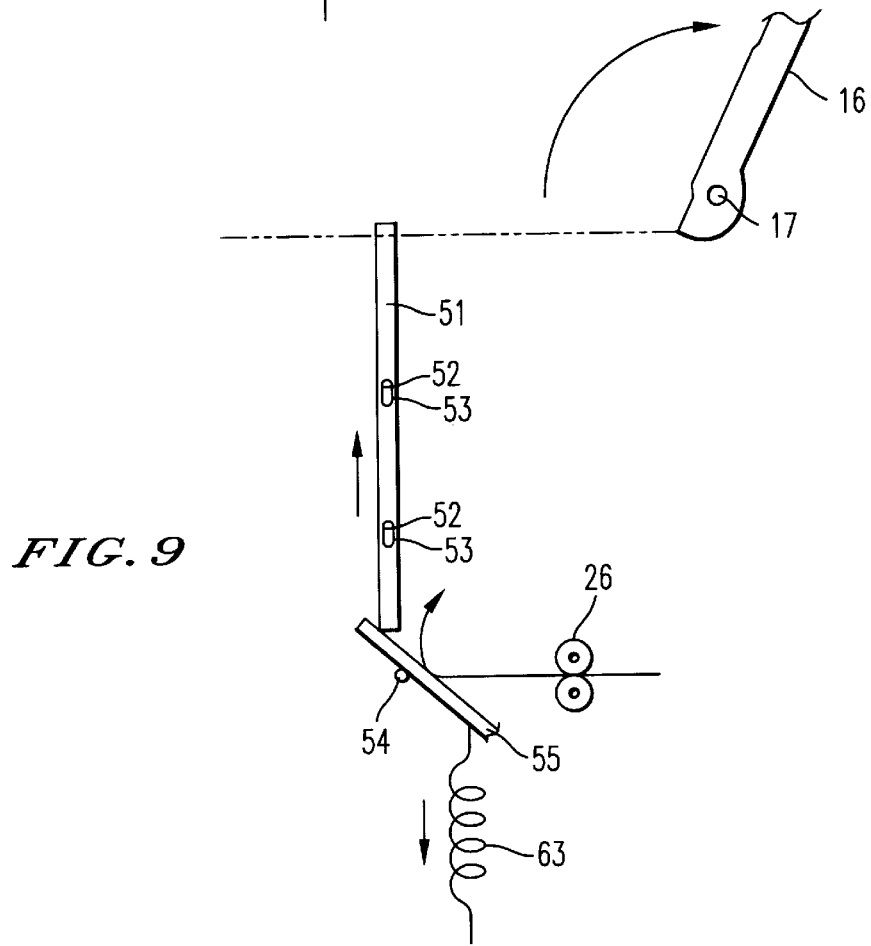
FIG. 9 is a cross-sectional view of an interlock system located in a position of a selection of a turn-around feeding path of the third embodiment of an image forming apparatus according to the present invention.

FIG. 9 is a cross-sectional view of the above interlock mechanism in a printing mode. When the document tray 4 is rotated clockwise about axis 54 and is located in the opened position, the power of pushing the interlock arm 51 in a vertical lower direction by the document tray 4 is canceled. In other words, when the document tray 4 rotates about axis 54 to the opened position, in the printing mode interlock arm 51 is pushed in a vertical upper direction by power of the spring 63 until a limited position results from pins 52. That is, the pins 52 limit the movement of the interlock arm 51 by contacting the lower portion of the slits 53. Further, a paper path selector 55 is also pulled by the power of the spring 63 clockwise about axis 54 until the path selector 55 selects the turn-around sheet feeding path. Therefore, paper path selector 55 is located at a position of selecting the turn-around feeding sheet path and any fed paper sheets are thus output to the turn-around feeding sheet path.

Figure 10:
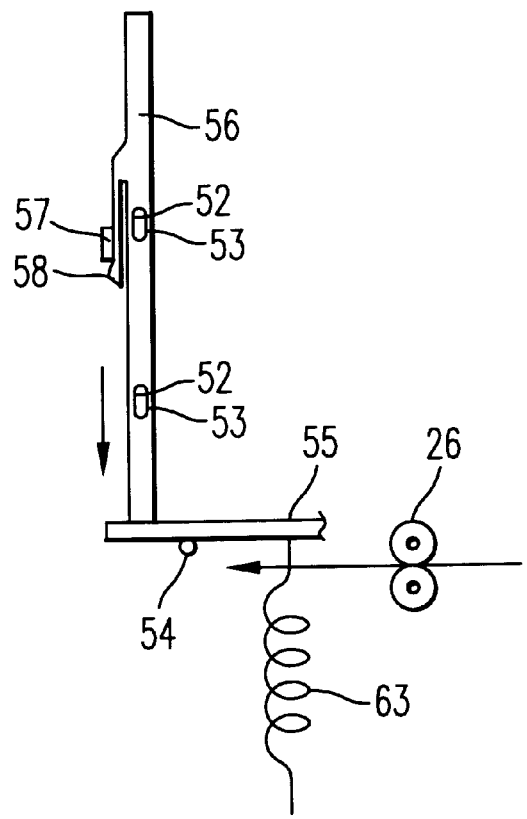
FIG. 10 is a cross-sectional view of an interlock supporter system of a fourth embodiment according to the present invention.

FIG. 10 shows a further embodiment in which the interlock arm 56 has a clip 58 and a clip stopper 57. An explanation of the devices and portions explained above are omitted.

In the scanning mode, when the document tray 4 pushes the top edge of the interlock arm 56, the interlock arm 56 slides down and pushes the paper path selector 55 downward. The paper path selector 55 then rotates about axis 54 and guides the feeding paper into the paper chute 24. Furthermore, the clip 58 of the interlock arm 56 is plugged in a clearance between a clip stopper 57 and the clip 58. When the clip 58 is plugged in this clearance, the interlock arm 56 is fixed. In this way, the paper path selector 55 can select between the straight sheet feeding path and the turn-around feeding sheet path.

Figure 11:
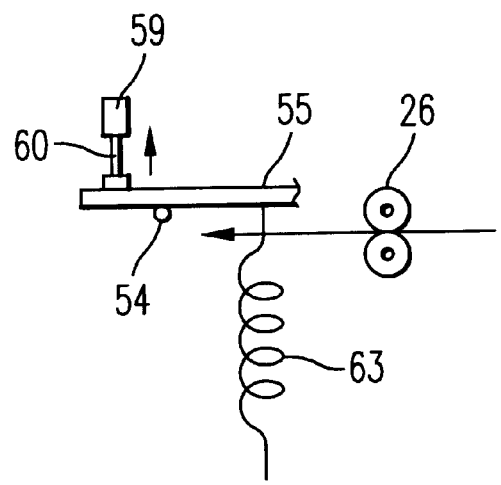
FIG. 11 is a cross-sectional view of an actuator for a sheet path selector of a fifth embodiment according to the present invention.

In a further embodiment as shown in FIG. 11, the apparatus has a solenoid actuator 59 rotating the paper path selector 55 about axis 54 according to the position of the document tray 4. The solenoid actuator 59 moves shaft 60 according to an electric signal. When the solenoid actuator 59 retracts shaft 60, the paper path selector 55 is pulled by power of the spring 63 and rotates clockwise about axis 54. When the solenoid actuator 59 extends shaft 60, the lower end of the shaft 60 contacts an edge of the paper path selector 55 and the paper path selector 55 is pushed and rotates counterclockwise about axis 54.

In the above situation, irrespective of the position of the interlock arm, the solenoid actuator 59 is able to select either the straight sheet feeding path or the turn-around feeding sheet path. In this case, a pressure sensor (not shown) detects whether the document tray 4 is located at the document guide position or the opened position. The solenoid actuator 59 drives the shaft 60 according to the detected signal of the pressure sensor.

The apparatus 1 is also able to set up a monitor by a CPU monitoring an output of this pressure sensor. The CPU judges the position of the interlock arm according to a signal of the monitor whether the document tray 4 is in the document guide position or the opened position. When the document tray 4 is located in the document guide position, the paper path selector 55 is rotated clockwise by the movement of the shaft 60 driven by the solenoid actuator 59 and selects the straight paper sheet feeding path. On the other hand, when the document tray 4 is located in the opened position, the paper path selector 55 is rotated counterclockwise by the power of the spring 63 and selects the turn-around sheet feeding path.

The above selection can prevent the occurrence of a jam at the cross point of the sheet paths even though an upper part space of the eject paper stacker 20 is covered with the document tray 4 located in the document guide position, because when the document tray 4 is located in the document guide position, the CPU does not output the control signal to the solenoid actuator 59.

Furthermore, the apparatus may also have a controller (not shown) of the solenoid actuator 59. Such a controller could prohibit the paper path selector 55 from selecting the turn-around sheet feeding path when the document tray 4 is located in the document guide position and is covering the opening of the upper part of the eject paper stacker 20. The paper path selector 55 is maintained in a position to guide any paper sheets to the straight sheet feeding path. In this way, solenoid actuator 59 is maintained in a condition in which the shaft 60 is extended and the lower end of the shaft 60 pushes the paper path selector 55. The paper path selector 55 is then located in the straight feeding sheet path and guides the ejected paper through the paper chute 24.

On the other hand, when the document tray 4 is located in the opened position, the controller selectable controls the solenoid actuator 59. When the controller receives a selection signal from the CPU, the controller controls the solenoid actuator 59 according to the selection signal from the CPU. In other words, in the opened position of the document tray 4, the controller can select either of the straight feeding sheet path or the turn-around feeding sheet path according to a signal from the CPU on the basis of an operation from a user.

When the turn-around sheet feeding path is selected on the basis of a signal from a user, the solenoid actuator 59 retracts the shaft 60 and the paper path selector 55 selects the turn-around sheet feeding path by the power of the spring 63. When the straight sheet feeding path is selected on the basis of a signal from a user, the solenoid actuator 59 extends the shaft 60 and the paper path selector 55 selects the straight sheet feeding path rotated centering on the axis 54 by a push of the shaft 60.

Furthermore, when the document tray 4 is located in the opened position, the document tray 4 covers the input panel 14. Therefore, the main body of the apparatus 1 maintains a clear appearance. Also, although the document tray 4 is located in the opened position, the printing condition display 43 is visibly maintained because the printing condition display 43 is located only on one side of the input panel 14.

Furthermore, in the printing mode, a user cannot touch the input panel 14 covered by the document tray 4. This layout prevents a user from mistouching the input panel 14. Also, a user can check the printing condition with the visible printing condition display 43. Furthermore, a user can also carry out other operations simultaneously, because the input panel 14 is located near the print condition display 14 on the main body of the apparatus 1.

Figure 12:
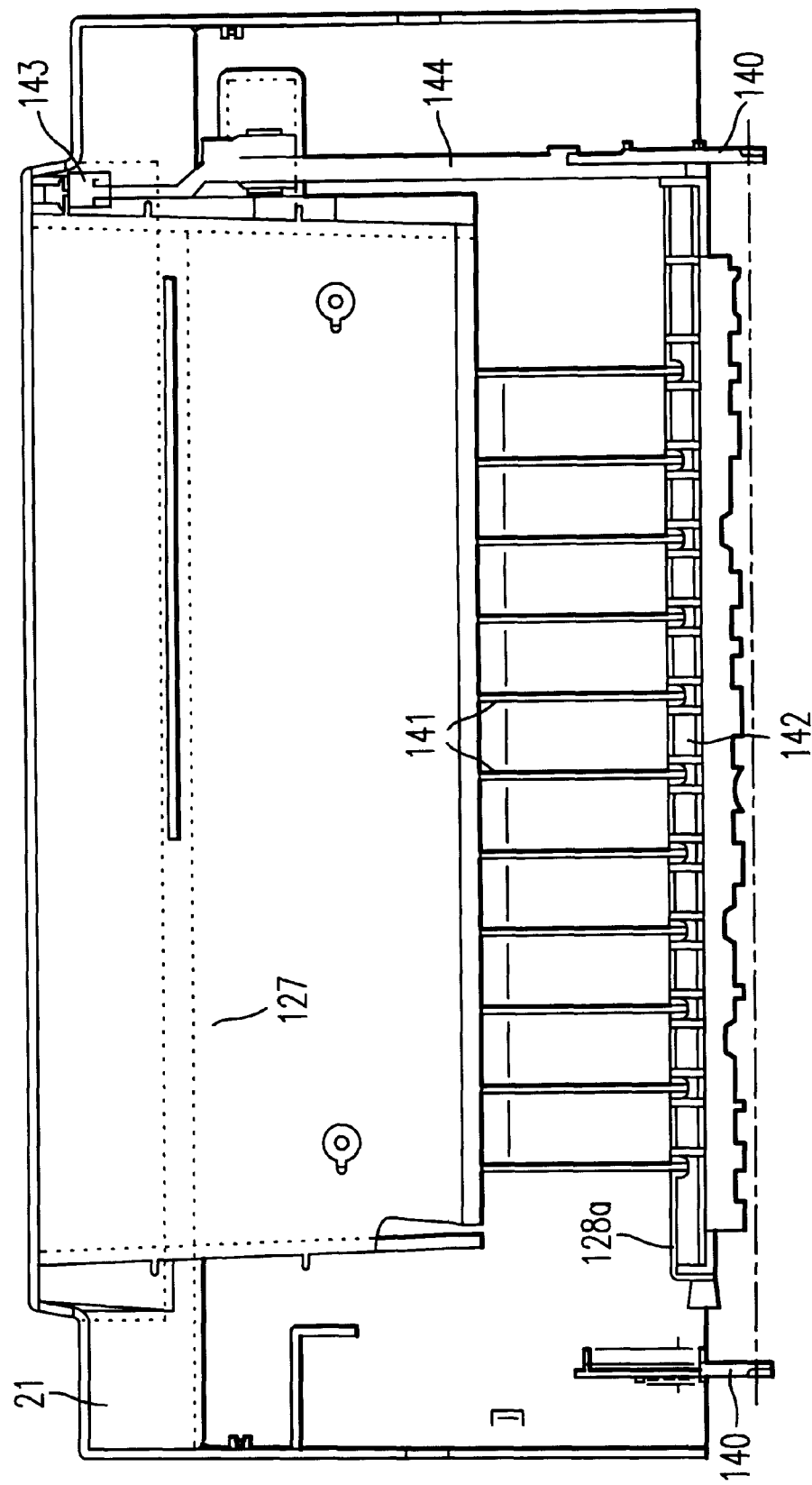
FIG. 12 shows details of a support wall from an inside of an image forming apparatus in a sixth embodiment of the present invention.

According to a further embodiment of the present invention, the support wall 21 can be structured to allow an operator to select between the straight feeding sheet path 30 and the turn-around paper path 23. FIG. 12 shows one embodiment of the support wall 21 to achieve such a further feature in the present invention. The support wall 21 in FIG. 12 is shown from a backside view, i.e., FIG. 12 shows the support wall 21 from an inside of the image forming apparatus 1.

As shown in FIG. 12, the support wall 21 can be rotated at a pair of hinges 140 to connect with the main body of the image forming apparatus 1. The pair of hinges 140 is located on lower sides of the support wall 21 and are attached to the main body of the image forming apparatus 1. Furthermore, the support wall 21 includes a paper chute 128a with guide ribs 141. The guide ribs 141 guide ejecting paper to the paper stacker located at an upper portion of the image forming apparatus 1, at an inner portion 127 of the ejected paper stacker. Furthermore, the support wall 21 further includes a paper path selector 142, a slide lever 143, and an interlock arm 144.

Figure 13:
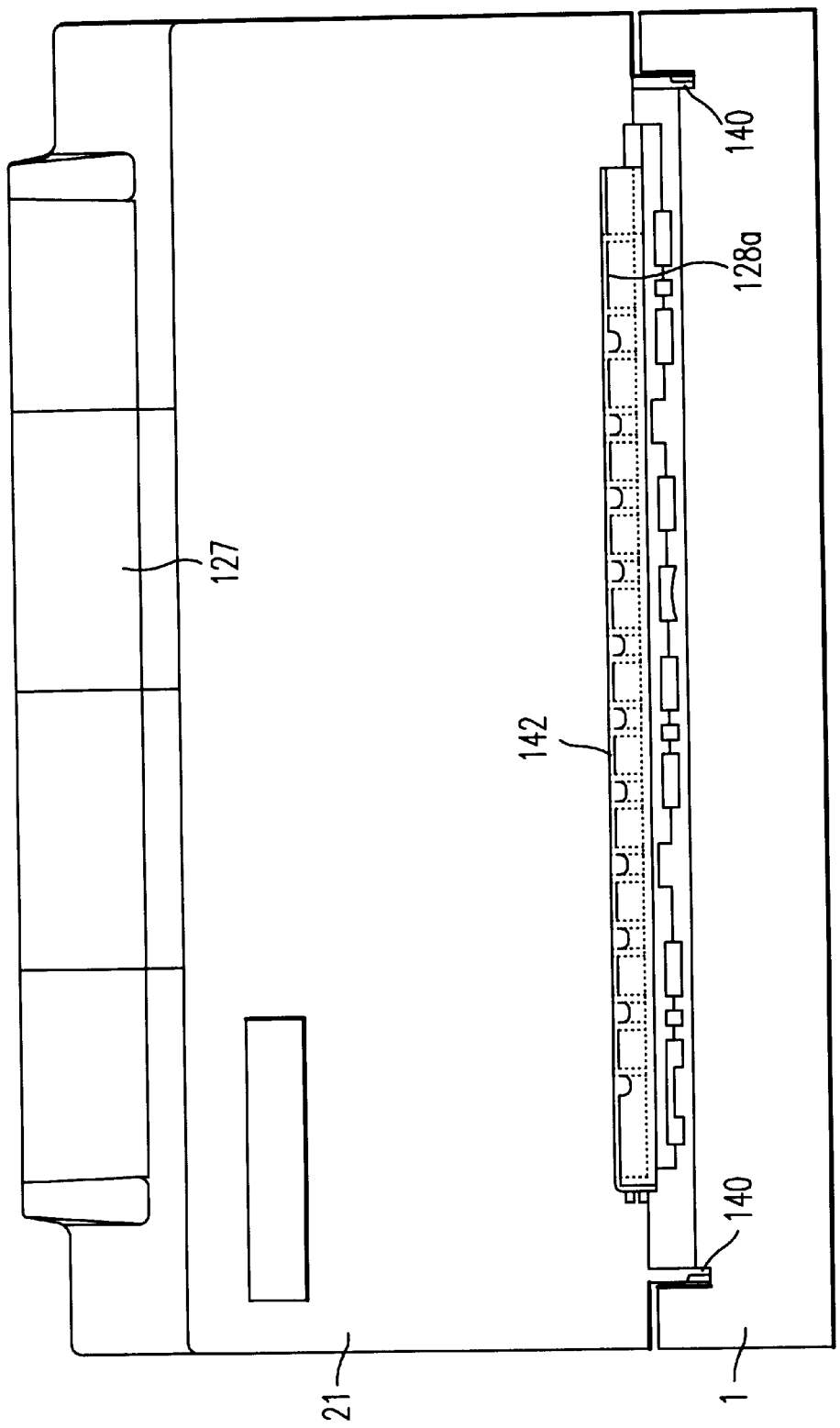
FIG. 13 shows an outside of a support wall in the sixth embodiment of the present invention.

FIG. 13 shows a front view of the support wall 21, i.e., a view from an outside of the image forming apparatus 1. As shown in FIG. 13, the support wall 21 has a notch portion for the paper chute 128a. Further, the paper path selector 142 is connected with the pair of hinges 140 of the support wall 21. The paper chute 128a corresponds to the paper chute 24 in FIG. 1.

Figure 14:
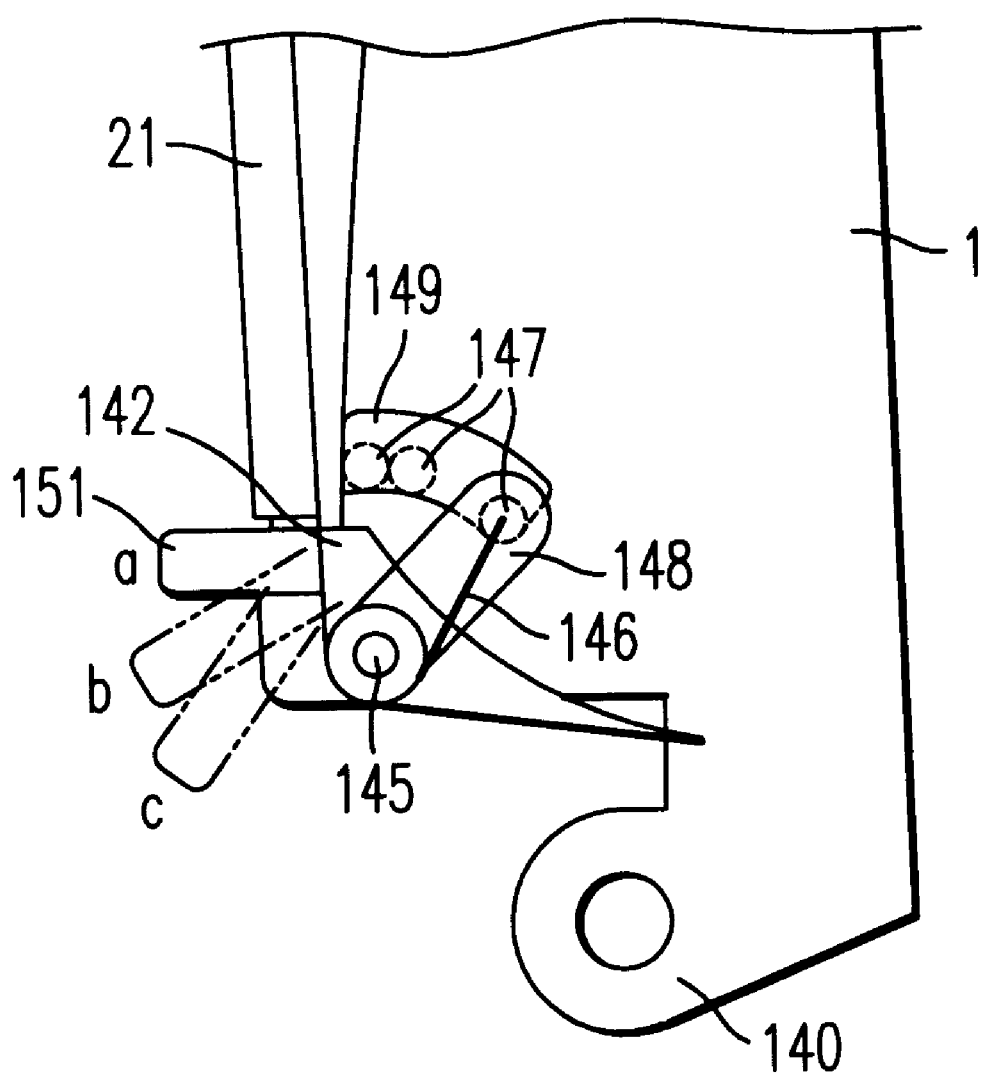
FIG. 14 shows a more detailed view of the support wall in the sixth embodiment of the present invention.

FIG. 14 shows a more detailed view of the portion of the support wall 21 at the paper path selector 142. As shown in FIG. 14, the paper path selector 142 has a bar 148 at an end thereof. The bar 148 also has a protrusion 147 at a top portion and is rotatably inserted in a hole 149 of the support wall 21. The shape of the hole 149 is round with a protuberance at a middle portion. A coil spring 146 biases the protrusion 147 of the paper path selector in the right side direction of FIG. 14.

The paper path selector 142 operates as follows. When the document tray 4 is located at the scanning position, shown in the solid lines in FIG. 1, the slide lever 143 connected with the interlock arm 144 is released. As a result, the lower end of the interlock arm 144 pushes the bar 148 of the paper path selector 142 in a left side direction of FIG. 14.

Therefore, the paper path selector 142 rotates in the left side direction against the power of the coil spring 146. The paper path selector 142 is then located at the position "b". In this position, if paper is fed from a paper supply unit 45 (see e.g. FIG. 2), the paper is output through the straight feeding path 30 and out of the paper chute 128a.

When the document tray 4 is located at the open position, shown by the dashed lines in FIG. 1, the slide lever 143 connected with the interlock arm 144 is pushed by the lower end of the document tray 4. The lower end of the interlock arm 144 then releases the bar 148 of the paper path selector 142. As a result, the paper path selector 142 rotates in the right side direction of FIG. 14 by the power of the coil spring 146. The paper path selector 142 is then located at the position "a". In this position the turn-around feeding sheet path 23 is selected.

A further feature in this further embodiment of the present invention is that an operator can select the straight feeding sheet path 30 to output paper from the paper chute 128a when the document tray 4 is located at the open position. If the operator desires such a selection, the operator pushes the lever 151 until it reaches the position "c". At this point the protrusion 147 with the paper path selector 142 overcomes the protuberance of the hole 149. Then, with the lever 151 at the position "c", the straight feeding path is selected even if the document tray 4 is in the open position. In this situation, when the operator wishes to reselect the turn-around sheet feeding path 23, the operator can pull the lever 151 until it again reaches the position "a".

In this way, in this further feature in the present invention the operator can selectively change the paper paths between the straight sheet feeding path 30 and the turn-around sheet feeding path 23 by the rotation of the lever 151.

Obviously, numerous additional modifications and variations of the present invention are possible in light of the above teachings. It is therefore to be understood that within the scope of the appended claims, the present invention may be practiced otherwise than as specifically described herein.

The present application is based on Japanese Priority Documents 9-119 146 and 9-073 245, the contents of which are incorporated herein by reference.

What is claimed as new and desired to be secured by Letters Patent of the United States is:

1. A sheet transport system for an image-forming apparatus including a scanner unit on an upper part of the image-forming apparatus, comprising:

a paper ejecting path ejecting an image formed paper sheet to an ejected paper stacker via the image-forming unit, wherein said paper ejecting path includes a straight feeding sheet path and a turn-around feeding sheet path, said straight feeding sheet path ejecting the image formed paper sheet at the image-forming unit through a paper chute, and said turn-around feeding sheet path ejecting the image formed paper sheet at the image-forming unit to the ejected paper stacker;

a scanning sheet path conveying an original document from an original document platform to a scanned paper stacker via the scanner unit;

a sheet path selector selecting one of the paper ejecting path or scanning sheet path, wherein the scanning sheet path and the paper ejecting path cross each other; and a manual paper ejecting path selector manually selecting one of the straight feeding sheet path and the turn-around feeding sheet path based on a position of the sheet path selector.

2. A sheet transport according to claim 1, wherein said paper ejecting path includes the scanned paper stacker.

3. A sheet transport system according to claim 1, wherein said paper eject selector interlocks with said sheet path selector and selects the straight feeding sheet path when the sheet path selector is located in an original document scanning position and selects the turn-around feeding sheet path when the sheet path selector is located in an image formed paper sheet stack position.

4. A sheet transport system for an image-forming apparatus including a scanner unit on an upper part of the image-forming apparatus, comprising:

a paper ejecting path ejecting an image formed paper sheet to an ejected paper stacker via the image-forming unit, wherein said paper ejecting path includes a straight feeding sheet path and a turn-around feeding sheet path, said straight feeding sheet path ejecting the image formed paper sheet at the image-forming unit through a paper chute, and said turn-around feeding sheet path ejecting the image formed paper sheet at the image-forming unit to the ejected paper stacker;

a scanning sheet path conveying an original document from an original document platform to a scanned paper stacker via the scanner unit;

a sheet path selector selecting one of the paper ejecting path or scanning sheet path, wherein the scanning sheet path and the paper ejecting path cross each other; and a manual paper ejecting path selector manually selecting one of the straight feeding sheet path and the turn-around feeding sheet path, wherein said sheet path selector forms a part of the scanning sheet path and a part of the paper ejecting path.

5. A sheet transport system for an image-forming apparatus including a scanner unit on an upper part of the image-forming apparatus, comprising:

a paper ejecting path ejecting an image formed paper sheet to an ejected paper stacker via the image-forming unit, wherein said paper ejecting path includes a straight feeding sheet path and a turn-around feeding sheet path, said straight feeding sheet path ejecting the image formed paper sheet at the image-forming unit through a paper chute, and said turn-around feeding sheet path ejecting the image formed paper sheet at the image-forming unit to the ejected paper stacker;

a scanning sheet path conveying an original document from an original document platform to a scanned paper stacker via the scanner unit;

a sheet path selector selecting one of the paper ejecting path or scanning sheet path, wherein the scanning sheet path and the paper ejecting path cross each other; and a manual paper ejecting path selector manually selecting one of the straight feeding sheet path and the turn-around feeding sheet path, wherein said sheet path selector includes a positionable tray forming the original document platform in said scanning sheet path and at least a portion of the ejected paper stacker in said paper ejecting path.

6. A sheet transport system for an image-forming apparatus including a scanner means on an upper part of the image-forming apparatus, comprising:

a paper ejecting path means for ejecting an image formed paper sheet to an ejected paper storing means via the image-forming unit, wherein said paper ejecting path includes a straight feeding sheet path and a turn-around feeding sheet path, said straight feeding sheet path ejecting the image formed paper sheet at the image-forming unit through a paper chute, and said turn-around feeding sheet path ejecting the image formed paper sheet at the image-forming unit to the ejected paper stacker;

a scanning sheet path means for conveying an original document from an original document platform means to a scanned paper storing means via the scanner means;

a sheet path selector means for selecting one of the paper ejecting path means or scanning sheet path means, wherein the scanning sheet path means and the paper ejecting path means cross each other; and a manual paper ejecting path selector means for manually selecting one of the straight feeding sheet path and turn-around feeding sheet path based on a position of the sheet path selector means.

7. A sheet transport system according to claim 6, wherein said paper ejecting path means includes the scanned paper storing means.

8. A sheet transport system according to claim 6, wherein said paper eject selector means interlocks with said sheet path selector means and selects the straight feeding sheet path means when the sheet path selector means is located in an original document scanning position and selects the turn-around feeding sheet path means when the sheet path selector means is located in an image formed paper sheet stack position.

9. A sheet transport system for an image-forming apparatus including a scanner means on an upper part of the image-forming apparatus, comprising:

a paper ejecting path means for ejecting an image formed paper sheet to an ejected paper storing means via the image-forming unit, wherein said paper ejecting path includes a straight feeding sheet path and a turn-around feeding sheet path, said straight feeding sheet path ejecting the image formed paper sheet at the image-forming unit through a paper chute, and said turn-around feeding sheet path ejecting the image formed paper sheet at the image-forming unit to the ejected paper stacker;

a scanning sheet path means for conveying an original document from an original document platform means to a scanned paper storing means via the scanner means;

a sheet path selector means for selecting one of the paper ejecting path means or scanning sheet path means, wherein the scanning sheet path means and the paper ejecting path means cross each other; and a manual paper ejecting path selector means for manually selecting one of the straight feeding sheet path and turn-around feeding sheet path, wherein said sheet path selector means forms a part of the scanning sheet path means and a part of the paper ejecting path means.

10. A sheet transport system for an image-forming apparatus including a scanner means on an upper part of the image-forming apparatus, comprising:

a paper ejecting path means for ejecting an image formed paper sheet to an ejected paper storing means via the image-forming unit, wherein said paper ejecting path includes a straight feeding sheet path and a turn-around feeding sheet path, said straight feeding sheet path ejecting the image formed paper sheet at the image-forming unit through a paper chute, and said turn-around feeding sheet path ejecting the image formed paper sheet at the image-forming unit to the ejected paper stacker;

a scanning sheet path means for conveying an original document from an original document platform means to a scanned paper storing means via the scanner means;

a sheet path selector means for selecting one of the paper ejecting path means or scanning sheet path means, wherein the scanning sheet path means and the paper ejecting path means cross each other; and a manual paper ejecting path selector means for manually selecting one of the straight feeding sheet path and turn-around feeding sheet path, wherein said sheet path selector means includes a positionable support means forming the original document platform means in said scanning sheet path means and at least a portion of the ejected paper storing means in said paper ejecting path means.

* * * * *